March 22, 1932.  R. H. BAHNEY  1,850,909
RECORDING METHOD AND APPARATUS
Filed Sept. 12, 1930   3 Sheets-Sheet 3
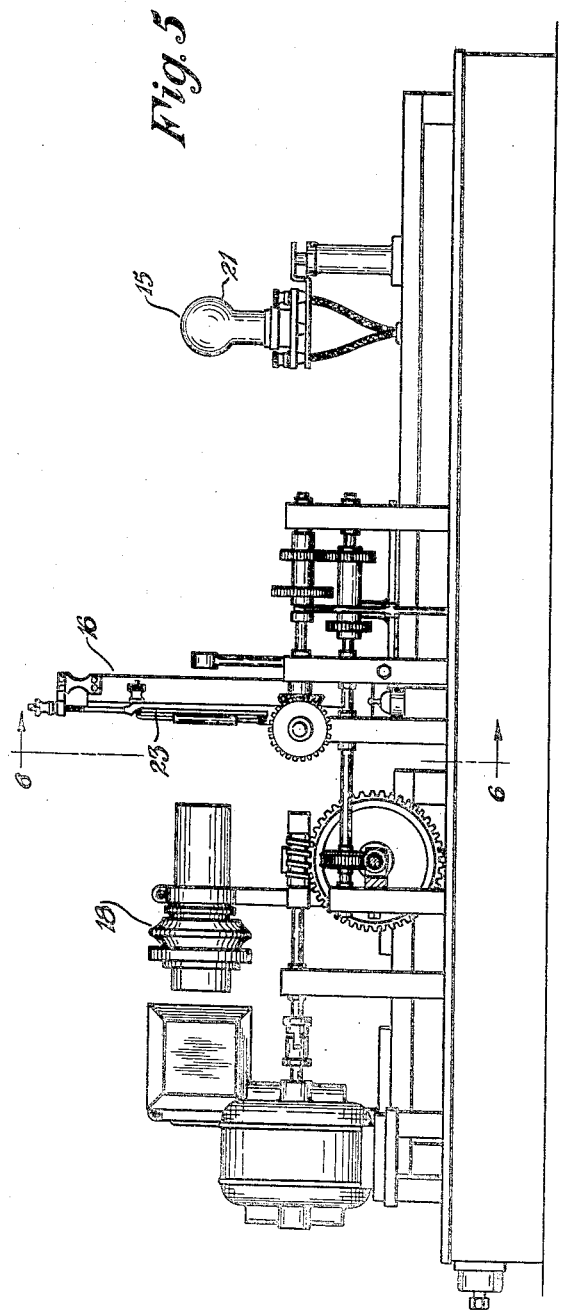
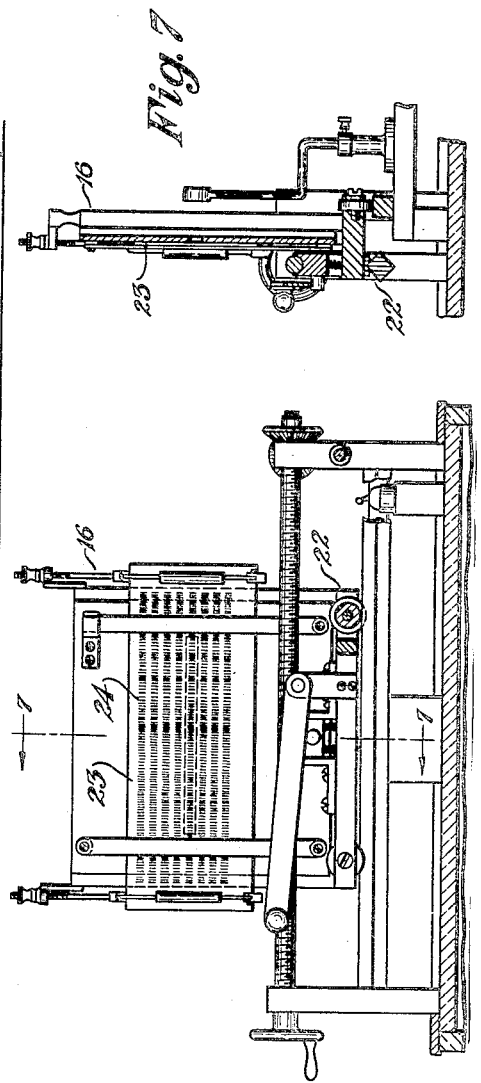
Inventor
R. H. Bahney
By Frease and Bishop
Attorneys Patented Mar. 22, 1932

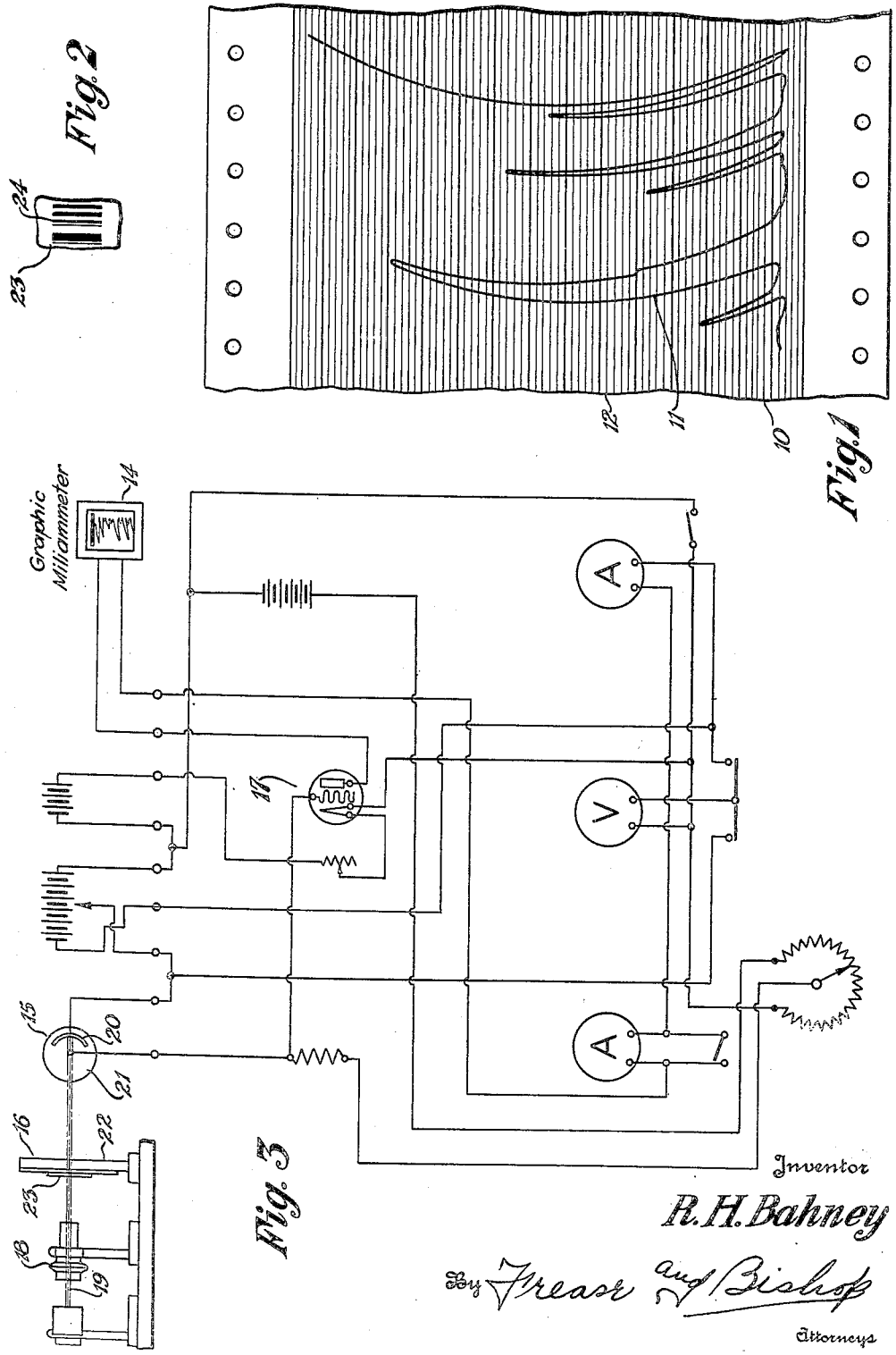
March 22, 1932.   R. H. BAHNEY   1,850,909
RECORDING METHOD AND APPARATUS
Filed Sept. 12, 1930   3 Sheets-Sheet 1

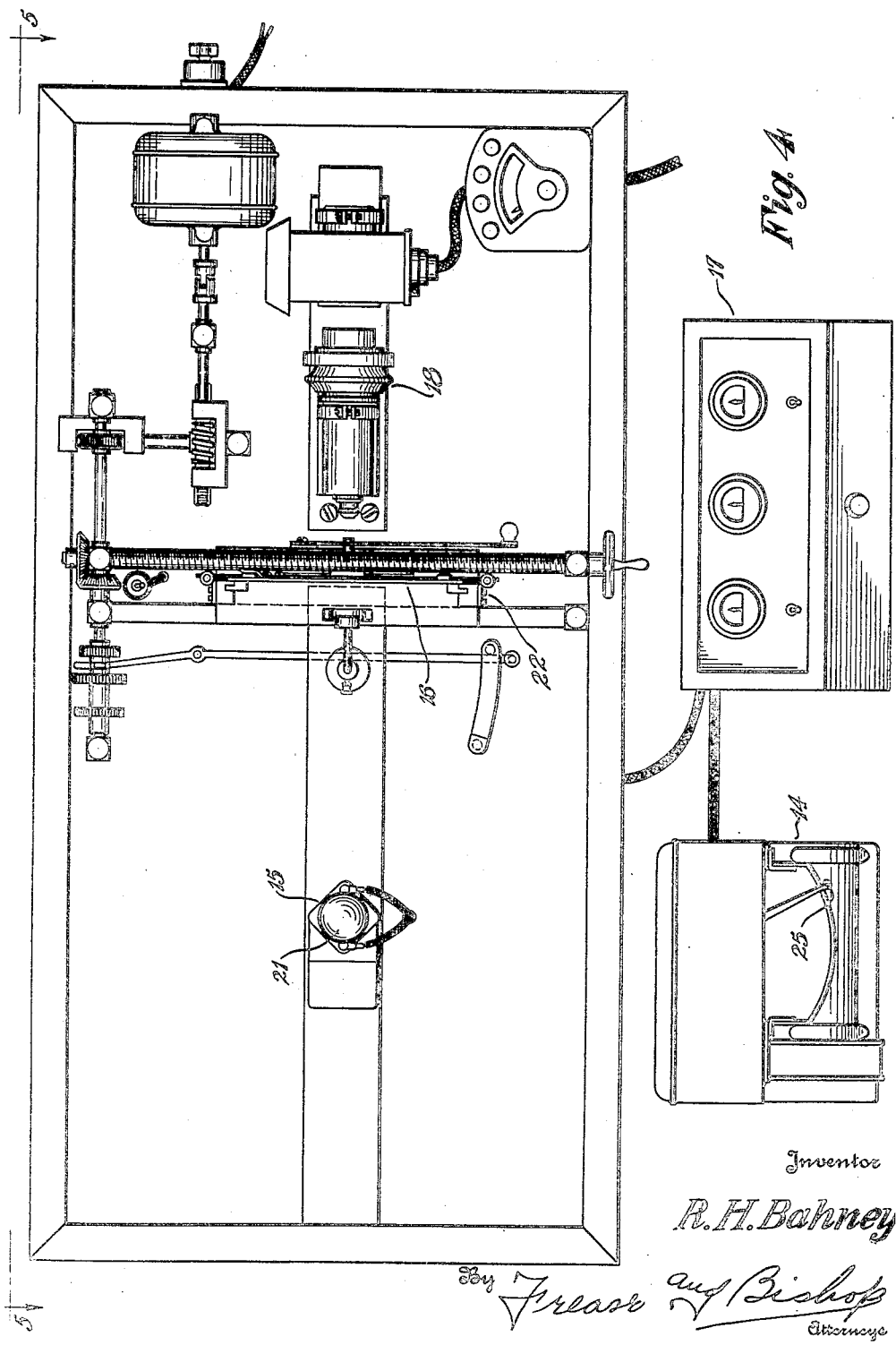

1,850,909

UNITED STATES PATENT OFFICE

ROBERT H. BAHNEY, OF MASSILLON, OHIO, ASSIGNOR TO REPUBLIC STEEL CORPORATION, OF YOUNGSTOWN, OHIO, A CORPORATION OF NEW JERSEY

RECORDING METHOD AND APPARATUS

Application filed September 12, 1930. Serial No. 481,453.

My invention relates to graphic charts more particularly for recording and representing characteristics of the spectra of incandescent materials; and still more particularly for recording and representing characteristics of the spectra of incandescent massive elements, and of incandescent substances, compounds, or alloys including massive elements, such as alloy steels.

Graphic charts of the characteristics of such spectra have heretofore been made by placing a thermopile in the path of a light beam of uniform intensity, connecting the thermopile with a mirror galvanometer, passing the photographic plate or film record of a spectrum across the light beam between the source thereof and the thermopile, and recording the swings of the mirror galvanometer by reflecting a light beam therefrom upon a sheet of moving photo-sensitized paper.

Because of the relatively long periods of the swings of the galvanometer mirror, the photographic chart thus made of any particular spectrum required a relatively long time to make, and the curve delineated is in the form of a jagged line including relatively sharp peaks and valleys corresponding to the maximum swings of the galvanometer mirror.

In order to be practically useful, it has been necessary to manually draw a smooth curve midway between the sharp peaks and valleys of the jagged curve of a photographic chart, and this average smooth curve represents the successive relative intensities, widths, and spacing of the successive lines of the photographic plate or film record of the spectrum from which the curve was made.

Any spectrum is the result of emission of radiant energy; and one characteristic of radiant energy is the amplitude or intensity of the simple or complex wave radiated from the source of energy.

Considered as electro-magnetic disturbances, waves of radiant energy may consist of, in order of descending frequencies, the highest known frequency gamma rays, X-rays, ultra violet rays, visible rays, infra red rays, and radio waves.

It has been very difficult to directly measure the intensity of most of these waves, but most if not all of the waves have the capacity of affecting the emulsion of a photographic plate or film, so that after the development thereof, the higher the intensity of the particular ray which has affected the film or plate, the lower the intensity of light which may be transmitted through the developed film or plate.

The so-called visible spectrum includes a ray of known frequency for substantially every element, and when any particular substance is excited to incandescence as by means of the flame, arc, or spark, and a beam of the light from the incandescent substance is passed through the slit and prism of a spectroscope, an elongated orderly array of lines or sets of lines, each corresponding to a single component of the substance may be directed by the spectroscope upon a photographic plate or film, after which the plate or film may be developed, and the relative quantity of each component of the substance is indicated by the relative intensity, width, and spacing of the lines therefor.

It is to be noted that the elongated orderly array of lines or sets of lines passing out of the spectroscope may directly effect a light sensitive device, other than a photographic plate or film, such as a photo-electric cell, and some of the lines or sets of lines may be directly visible to the eye if reflected from a screen.

Particularly from the standpoint of making a set of standard charts by the use of the present invention, it is preferred to make an intermediate photographic record or spectrograph of the spectrum of any particular incandescent material being examined, and then to recreate this spectrum by passing light through the spectrograph as is hereinafter set forth in greater detail.

The differences between the relative intensities, widths, and spacings of the lines of the spectra of two samples of incandescent alloy steel for example, which vary from each other only by a small fraction of 1% which may be 0.001% of a particular element, are not discernible to the naked eye of an observer, and research studies have heretofore been made by drawing graphic charts of the characteristics of such spectra as aforesaid by the use of spectrographs thereof and a thermopile and a galvanometer.

Such charts require for their production the services of a highly skilled scientist, and take days to make, and accordingly are of no use in the commercial operation of a steel plant.

From the foregoing it may be seen that a spectrum of an incandescent material is a highly accurate indicator of the qualitative and quantitative characteristics of the material, and the spectrograph of such spectrum, or a spectrum recreated from such spectrograph is likewise a highly accurate indicator of the qualitative and quantitative characteristics of the material or substance.

The objects of the present invention include, accordingly, the provision of improved methods and apparatus whereby such highly accurate spectra of incandescent materials may be utilized in connection with the commercial operation of a modern alloy steel plant, or similar industrial enterprise, so that highly accurate and very rapid analyses may be made of materials by drawing improved charts by the use of the improved methods and apparatus, each chart including a curve whose form directly characterizes the spectrum of a particular incandescent material.

The foregoing and other objects are attained by the methods, apparatus, parts, improvements, and combinations which comprise the present invention, and which are particularly and distinctly set forth and pointed out in the appended claims forming part hereof.

One embodiment of the improved apparatus and component parts thereof used in carrying out the improved method hereof, together with one of the improved charts made by the use thereof, are illustrated in the accompanying drawings forming part hereof, in which—

Figure 1 is a fragmentary view of one of the improved charts made by the use of the methods and apparatus of the present invention, the chart comprising a continuously inscribed line determining a curve whose form particularly characterizes the spectrum of a particular incandescent material;

Fig. 2, a fragmentary enlarged view illustrating the photographic record of the particular spectrum from which the chart of Fig. 1 was made by the use of the improved apparatus hereof for carrying out the improved method hereof;

Fig. 3, a diagrammatic view of one embodiment of the improved apparatus for carrying out the improved method for making the improved charts hereof;

Fig. 4, a top plan view of one embodiment of the improved apparatus;

Fig. 5, a fragmentary elevation view thereof with distant parts removed looking in the direction of the arrows 5—5, Fig. 4;

Fig. 6, a fragmentary sectional view thereof as on line 6—6, Fig. 5; and

Fig. 7, a fragmentary sectional view thereof as on line 7—7, Fig. 6.

Similar numerals refer to similar parts throughout the drawings.

The improved chart indicated generally at 10 in Fig. 1 comprises the direct product of the improved graphic recording means hereinafter set forth in detail for carrying out the improved method of continuously inscribing points or a line, and determining the curve 11 which is delineated on a strip of paper 12, by operation of a graphic recording meter actuated as hereinafter set forth in detail.

The curve 11 is thus continuously and mechanically inscribed, and the form of the curve 11 directly characterizes a particular portion of the spectrum of a particular incandescent alloy steel, and which may be that portion of the spectrum determined by an element X.

The curve 11 of the chart 10 is drawn by the improved method hereof carried out by the improved apparatus hereof, one embodiment of which is indicated diagrammatically in Fig. 3 and pictorially in Figs. 4 to 7 inclusive, and which includes graphic recording means indicated generally by 14, photo-electric means indicated generally by 15 for actuating the graphic recording means, means indicated generally by 16 for varying the actuating output of the photo-electric means in accordance with the variations in intensity, width, and spacing of the lines of the spectrum of a particular incandescent material, and preferably means indicated generally by 17 for amplifying the actuating output of the photo-electric means.

The means 16 for varying the actuating output of the photo-electric means 15 in accordance with the variations in intensity, width, and spacing of the lines of the spectrum of a particular incandescent material include means indicated generally by 18 for directing through a slit a vertical band beam of light indicated by the dash lines 19, preferably of uniform intensity, upon the plate 20 of a photo-electric cell 21 comprising part of the photo-electric means 15.

A preferably motor driven travelling carriage indicated generally by 22 is provided for traversing a film or plate 23 on which is photographically recorded the lines 24 comprising the spectrum of a particular incandescent material under consideration, so that the spectrum lines 24 move laterally across the light beam 19.

The illustrated means 16 for varying the actuating output of the photo-electric means 15, and including the light beam directing means 18 and the plate moving carriage 22, as illustrated are of a standard construction used for the thermopile galvanometer apparatus heretofore described in which a thermopile is placed in the path of the light beam 19, and is connected with a mirror galvanometer as aforesaid.

As aforesaid the plate 20 of the photo-electric cell 21 is placed in the path of the light beam 19 and accordingly as the spectrum lines 24 are moved across the beam, the intensity of the light striking the plate 20 is varied according to the densities, the widths and relative spacings of the spectrum lines 24.

The plate 23 on which are recorded the spectrum lines 24 may be made by any standard spectograph, such as the El Hilger spectrograph.

The output current of the photo-electric cell 21 thus varies in accordance with the variations and intensities of the light beam 19 caused by the movement of the spectrum lines 24 across the light beam 19.

The output circuit of the photo-electric cell 21 is connected with the graphic recording means 14, and as aforesaid amplifying means 17 are preferably interposed between the photo-electric cell 21 and the graphic recording means 14.

The amplifying means as illustrated comprise a single stage three electrode vacuum tube amplifier circuit which amplifies the output current of the photo-electric cell in a well known manner, so that the actuating current passing through the graphic recording meter is of suitable magnitude for satisfactorily operating the graphic recording meter.

Accordingly the inscribing needle 25 of the graphic recording meter 14 is substantially instantaneously excited by the amplified current output of the amplifier 17 and draws the improved curve 11.

The graphic recording meter may be of any standard construction, as for example a graphic recording meter, such as that set forth in U. S. Letters Patent No. 1,370,179, issued March 1, 1921, to Donald J. Angus, wherein the inscribing needle is substantially instantaneously excited by or responsive to the input current.

The improved apparatus thus carries out the improved method of making the improved charts by substantially instantaneously exciting the inscribing needle 24 of the graphic recording means 14 by an amplified current delivered by the amplifier 17 and the amplified current being photo-electrically varied in accordance with the variations in intensity, width, and spacing of the lines of the spectrum of a particular incandescent material, the lines 24 of which are passed in the path of the exciting light beam 19.

In the use of the improved charts hereof in connection with the commercial operation of a plant engaged in the manufacture of alloy steels, for example, a very careful chemical analysis is made of a specimen of a particular alloy steel.

A photographic record of the spectrum of the particular steel is then made, which record may be the plate 23.

The particular plate 23 is then passed through the improved apparatus, and a particular chart 10 is drawn, which is labeled according to the chemical analysis theretofore made.

Accordingly a series of standard charts may be made for any desired number of alloys.

Consequently for an unknown alloy, a photographic record is made of its spectrum, and a chart is drawn from this photograph of the unknown spectrum.

The electrical characteristics of the apparatus are of course maintained constant, and accordingly if the chart drawn from the unknown coincides with one of the heretofore drawn standard charts, it is ascertained that the unknown has the same analysis as the alloy of the particular standard chart.

It is to be explained that the peaks and spacing of the peaks of any particular curve drawn from photographic record of a particular spectrum are so characterized in form and arrangement that the eye may easily distinguish differences or identities between two charts, and the differences are such as to enable the eye to quickly distinguish variations of a very small fraction of any particular element in any particular alloy from the improved chart drawn therefrom as compared with standard charts.

In fact by thus comparing charts drawn of unknown alloys with standard charts, it is possible to cut down the time required for making a quantitative analysis of an alloy steel from about four hours which is the time required for the usual laboratory analysis, to about three to ten minutes which is the time required for making the photographic record of the unknown spectrum and for drawing one of the improved charts therefrom.

The improved charts are so easy to make and read that relatively unskilled technicians may be employed for the purpose.

It should be noted that the spectra of incandescent materials include frequencies outside of the band of visible frequencies, and that the spectra of incandescent materials should not be confused with mere color spectra which include only those frequencies within the visible band.

I claim:

1. The method of operating electric graphic recording means including an inscribing needle substantially instantaneously responsive to current variations for making a chart including a curve whose form directly characterizes the spectrum of a particular incandescent material, which includes exciting the material to incandescence, creating a spectrum of the incandescent material, varying a current through the medium of the spectrum, and exciting the substantially instantaneously responsive inscribing needle of the graphic recording means by the varied current.

2. Apparatus for making a chart including a curve whose form directly characterizes the spectrum of a particular incandescent material, the apparatus including means for creating a spectrum of the incandescent material, electric graphic recording means including an input circuit and an inscribing needle substantially instantaneously responsive to current variations in the input circuit, and means for varying the current in the input circuit through the medium of the spectrum.

In testimony that I claim the above, I have hereunto subscribed my name.

ROBERT H. BAHNEY.